United States Patent
Shiraishi et al.

(10) Patent No.: US 8,919,488 B2
(45) Date of Patent: Dec. 30, 2014

(54) CONSTRUCTION MACHINE

(71) Applicant: Kobelco Construction Machinery Co., Ltd., Hiroshima-shi (JP)

(72) Inventors: Tatsuya Shiraishi, Hiroshima (JP); Kazuhiro Uesugi, Hiroshima (JP)

(73) Assignee: Kobelco Construction Machinery Co., Ltd., Hiroshima-shi (JP)

( * ) Notice: Subject to any disclaimer, the term of this patent is extended or adjusted under 35 U.S.C. 154(b) by 0 days.

(21) Appl. No.: 14/254,263

(22) Filed: Apr. 16, 2014

(65) Prior Publication Data

US 2014/0311816 A1    Oct. 23, 2014

(30) Foreign Application Priority Data

Apr. 19, 2013   (JP) ................. 2013-088889

(51) Int. Cl.
　　*B62D 21/00* (2006.01)
　　*B60K 13/04* (2006.01)
　　*E02F 9/08* (2006.01)

(52) U.S. Cl.
　　CPC ................... *E02F 9/0866* (2013.01)
　　USPC .......................... 180/311; 180/309

(58) Field of Classification Search
　　USPC ............... 180/309, 311, 296, 89.2, 225, 89.1, 180/89.12, 312, 68.1
　　See application file for complete search history.

(56) References Cited

U.S. PATENT DOCUMENTS

| 6,192,839 | B1 * | 2/2001 | Takeshita et al. | .......... 123/41.49 |
| 6,745,860 | B2 * | 6/2004 | Yabe | .......... 180/68.1 |
| 6,922,925 | B2 * | 8/2005 | Watanabe et al. | ........... 37/466 |
| 7,131,422 | B2 * | 11/2006 | Kimura et al. | ........... 123/198 E |
| 7,134,518 | B2 * | 11/2006 | Arai et al. | ........... 180/68.1 |
| 7,143,852 | B2 * | 12/2006 | Yatsuda et al. | .......... 180/69.2 |
| 7,388,301 | B2 * | 6/2008 | Komiyama et al. | .......... 180/312 |
| 7,690,460 | B2 * | 4/2010 | Sakitani et al. | .......... 180/68.1 |
| 7,900,730 | B2 * | 3/2011 | Hokimoto | .......... 180/89.1 |
| 8,006,991 | B2 * | 8/2011 | Taniuchi et al. | .......... 180/68.1 |
| 8,037,963 | B2 * | 10/2011 | Nishimura et al. | .......... 180/291 |
| 8,550,198 | B2 * | 10/2013 | Isaka et al. | .......... 180/68.1 |
| 2008/0191516 | A1 * | 8/2008 | Ayabe et al. | .......... 296/190.05 |
| 2013/0081887 | A1 | 4/2013 | Tsuchihashi et al. | |

FOREIGN PATENT DOCUMENTS

| EP | 2 578 755 A2 | 4/2013 |
| EP | 2 578 755 A3 | 4/2013 |
| JP | 9-156384 | 6/1997 |
| JP | 2009-57795 | 3/2009 |
| JP | 2013-39895 | 2/2013 |

OTHER PUBLICATIONS

Extended Search Report issued Jun. 17, 2014 in European Patent Application No. 14165101.8.

* cited by examiner

*Primary Examiner* — J. Allen Shriver, II
*Assistant Examiner* — James M Dolak
(74) *Attorney, Agent, or Firm* — Oblon, Spivak, McClelland, Maier & Neustadt, L.L.P.

(57) ABSTRACT

Base end portions of a pair of engine support legs are welded to an upper frame in an exhaust duct. The pair of engine support legs extends to a notched portion of the exhaust duct from the base end portions to front end portions thereof. The front end portions project to the outside of the exhaust duct. The pair of engine support legs is connected to each other by a reinforcement plate arranged to close the notched portion of the exhaust duct.

4 Claims, 7 Drawing Sheets

CONSTRUCTION MACHINE

BACKGROUND OF THE INVENTION

1. Field of the Invention

This invention relates to a construction machine having an exhaust structure.

2. Description of the Related Art

In a background art, there is known a construction machine including a lower traveling body, an upper turning body turnably mounted on the lower traveling body, and an engine mounted in an engine room of the upper turning body (refer to, for example, Japanese Patent Application Laid-open No. 2013-039895).

According to a construction machine of Japanese Patent Application Laid-open No. 2013-039895, an exhaust duct is arranged in an engine room. An air introduction port is formed on an upper face side of the exhaust duct, and an air exhaust port is formed on a lower face side of the exhaust duct. Thereby, air which has been introduced from outside of the engine room and cooled the engine is exhausted in a downward direction by passing through the exhaust duct from the engine room.

Here, the engine is supported by a gate type mount member for an engine (engine bracket) including a pair of vertical plates and a cross beam respectively welded to front end portions of the pair of vertical plates as shown in, for example, Japanese Patent Application Laid-open No. 2009-057795. Further, ordinarily, a reinforcement plate for connecting a pair of support legs of the engine bracket to each other is welded between the pair of support legs for ensuring a rigidity, although not specifically disclosed in Patent Literature 2. The reinforcement plate inclinedly extends from a base end portion to a front end portion of the engine bracket.

However, according to the construction machine of the background art, there poses a problem that a flow of air in the exhaust duct is hampered by the engine bracket. Specifically, the exhaust duct of Patent Literature 1 is arranged at a position in the engine room proximate to a cross beam of an upper frame. Consequently, the base end portion of the engine bracket of Patent Literature 2 is welded to the cross beam in the exhaust duct.

Here, in a case where the reinforcement plate of the engine bracket inclinedly extends from the base end portion to the front end portion, there is brought about a state in which a portion of an air flow path in the exhaust duct, that is, a portion between the pair of support legs of the engine bracket is closed by the reinforcement plate. Consequently, there poses a problem of hampering the flow of air of the exhaust duct by the reinforcement plate.

SUMMARY OF THE INVENTION

It is an object of this invention to provide a construction machine for preventing a flow of air exhausted by passing through an exhaust duct from an engine room from being hampered by improving a shape of an engine bracket.

A construction machine of this invention includes:

a lower traveling body;

an upper turning body which has an engine room and an upper frame including a bottom plate formed with an opening hole communicating with an inside of the engine room, and which is turnably mounted on the lower traveling body;

an engine accommodated inside the engine room;

an exhaust duct provided in the engine room, for guiding air having cooled the engine to the opening hole, to exhaust the air to the outside of the engine room; and a projecting bracket which is a bracket for supporting the engine and includes an end portion on one side fixed to the upper frame inside the exhaust duct, and an end portion on the other side projecting to the outside of the exhaust duct, wherein the exhaust duct includes an intake port for taking in the air in the engine room, an exhaust port for exhausting the air taken in from the intake port toward the opening hole, and an opening for causing the end portion on the other side of the projecting bracket to project to the outside of the exhaust duct, and wherein the projecting bracket includes:

a pair of engine support legs formed by a pair of plate members standed at an interval therebetween, each of the engine support legs including a base end portion fixed to the upper frame in the exhaust duct, and a front end portion projecting to the outside of the exhaust duct by passing through the opening;

an engine mount plate which is connected to the respective front end portions of the pair of engine support legs and allows the engine to be mounted on the engine mount plate; and a reinforcement plate arranged between the pair of engine support legs so as to close the opening of the exhaust duct, and connecting the pair of engine support legs to each other.

DESCRIPTION OF THE PREFERRED EMBODIMENTS

An explanation will be given of an embodiment of this invention based on the drawings as follows. Incidentally, the following explanation of the preferred embodiments is essentially only an exemplification, and does not intend to restrict this invention, its application, or its use. The respective drawings indicate an up and down direction, a front and rear direction, and a left and right direction by arrow marks. The explanation will be given of the up and down direction and the like in accordance with the directions indicated by the arrow marks unless referred to otherwise.

Figure 1:
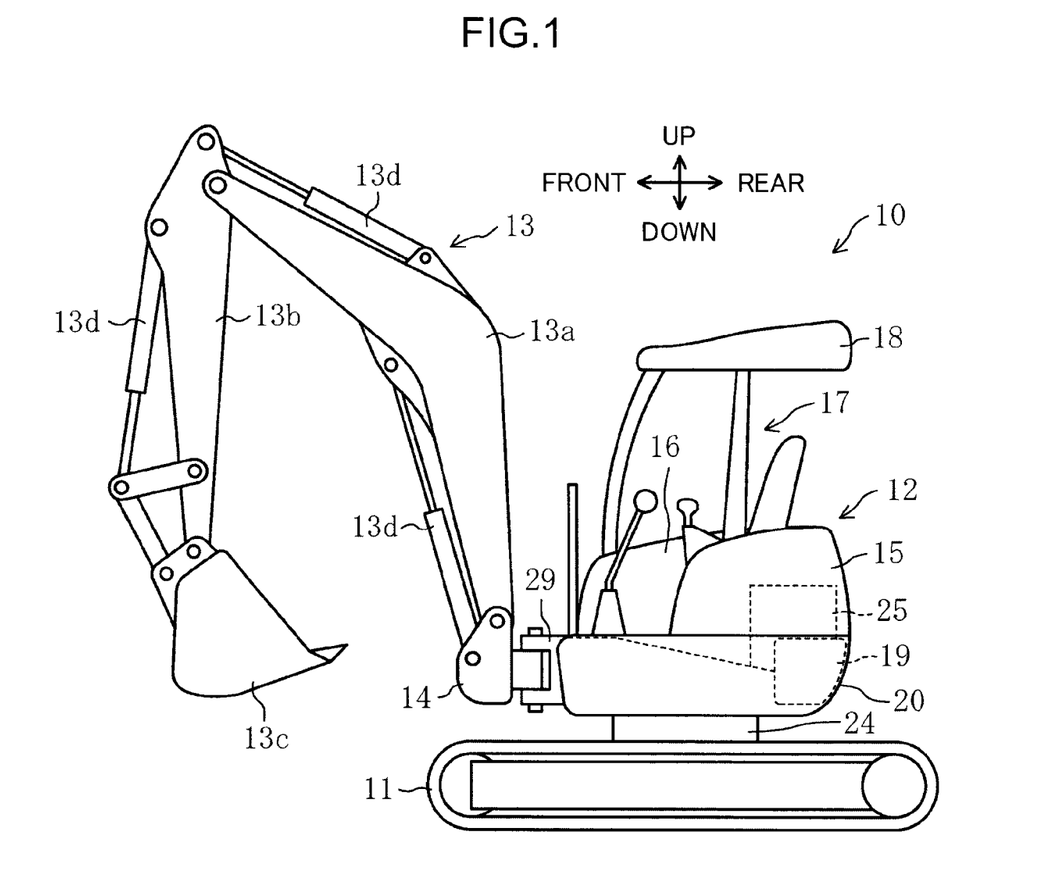
FIG. 1 is a side view showing a configuration of a construction machine according to an embodiment of this invention.

FIG. 1 is a side view showing a configuration of a construction machine according to the embodiment of this invention. As shown in FIG. 1, a construction machine 10 is a small-sized machine of a rearward small turning type. The construction machine 10 includes a lower traveling body 11 of a crawler type, and upper turning body 12 turnably mounted on the lower traveling body 11.

A rear side of the upper turning body 12 is installed with an engine room 15 for accommodating an engine 25 and the like. A right side of the upper turning body 12 is installed with a side machine room 16 for accommodating a fuel tank, a hydraulic fluid tank and the like, not illustrated. A left side of the upper turning body 12 is arranged with an operation space 17 including a driver seat, an operation lever and the like. An upper side of the upper turning body 12 is installed with a hood 18 to cover an upper side of the operation space 17.

A front side of the upper turning body 12 is attached with an attachment 13 supported to be capable of rising and falling and swingably in a left and right direction. The attachment 13 is for carrying out a drilling operation or the like. The attachment 13 includes a boom 13a a base end portion of which is pivotably attached to a front bracket 29 of the upper turning body 12 via a swing bracket 14, an arm 13b pivotably attached to a front end side of the boom 13a, and a bucket 13c pivotably attached to a front end side of the arm 13b.

According to the construction machine 10, the attachment 13 can be moved so as to be capable of rising and falling, by expanding or contracting hydraulic cylinders 13d respectively in correspondence with the boom 13a, the arm 13b, and the bucket 13c by operating the operation lever or the like. Also, the attachment 13 can be moved swingably in a left and right direction by expanding or contracting a swing cylinder, not illustrated.

The upper turning body 12 includes a counter weight 19 and an upper frame 20. Specifically, a rear portion of the upper turning body 12 is installed with the counter weight 19 of a large weight for maintaining a balance in a front and rear direction against the operating attachment 13. The upper frame 20 of the upper turning body 12 is turnably supported by the lower traveling body 11 via a swing bearing 24 in a circular ring shape.

Figure 2:
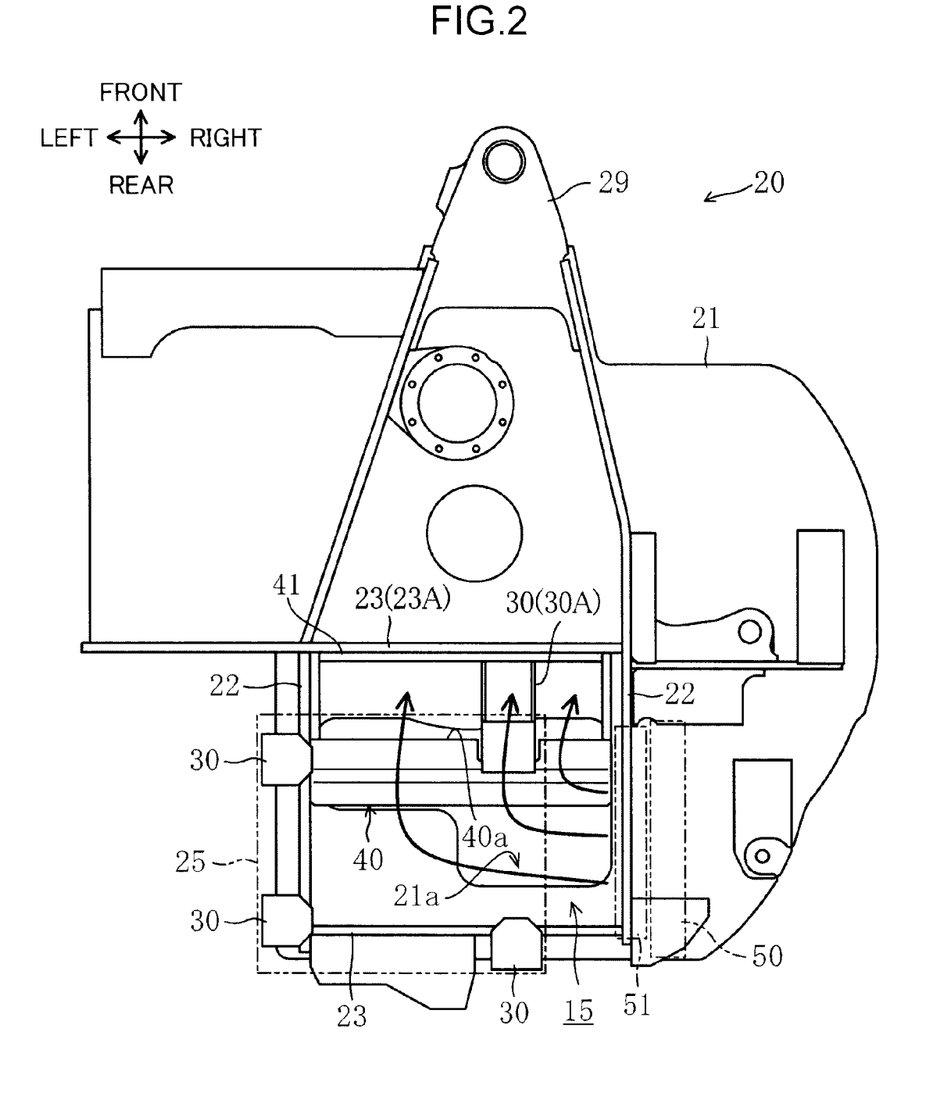
FIG. 2 is a plane view showing a configuration of an upper frame of FIG. 1.

As shown in FIG. 2, the upper frame 20 includes a bottom plate 21, a pair of left and right vertical plates 22 stood on the bottom plate 21 and extending in a front and rear direction, and a cross beam 23 connecting the pair of vertical plates 22.

The bottom plate 21 is formed with an opening hole 21a for communicating with inside of the engine room 15 provided at a rear portion of the upper frame 20. The opening hole 21a is opened to face the engine 25 arranged at the engine room 15, and is used as an operation hole for carrying out a maintenance operation of the engine 25.

The pair of vertical plates 22 is arranged at a center position in the left and right direction of the upper frame 20, and reinforces a strength and a rigidity in a front and rear direction of the upper frame 20. Front portions of the vertical plates 22 are attached with the front bracket 29 for receiving a load of the operating attachment 13. The pair of vertical plates 22 is arranged in a V-like shape to be gradually separated from each other toward a rear side from front end portions thereof to center portions thereof, and arranged to extend in parallel with each other in the front and rear direction from center portions to rear end portions thereof.

The cross beam 23 connects the pair of vertical plates 22 by being stood on the bottom plate 21 and extending in the left and right direction. The cross beam 23 is provided in plurality at intervals therebetween in the front and rear direction and reinforces a strength and a rigidity in the left and right direction of the upper frame 20.

Inside of the engine room 15 is arranged with a heat exchanger 50 of a radiator for cooling the engine, an oil cooler and the like, a blowing fan 51, and the engine 25 successively from a right side.

When the blowing fan 51 is driven, outer air is introduced from a suction port, not illustrated, formed at a cover of the engine room 15. The outer air is subjected, in the heat exchanger 50, to heat exchange with a coolant present in the heat exchanger 50. The air having been subjected to the heat exchange is used for cooling the engine 25 by being blown out to the engine 25. An exhaust duct 40 is arranged in the engine room 15. The air having cooled the engine 25 flows to an intake port 40a of the exhaust duct 40 as shown in FIG. 2. The exhaust duct 40 is arranged between the pair of vertical plates 22 and extends substantially over a total width in the left and right direction.

Figure 3:
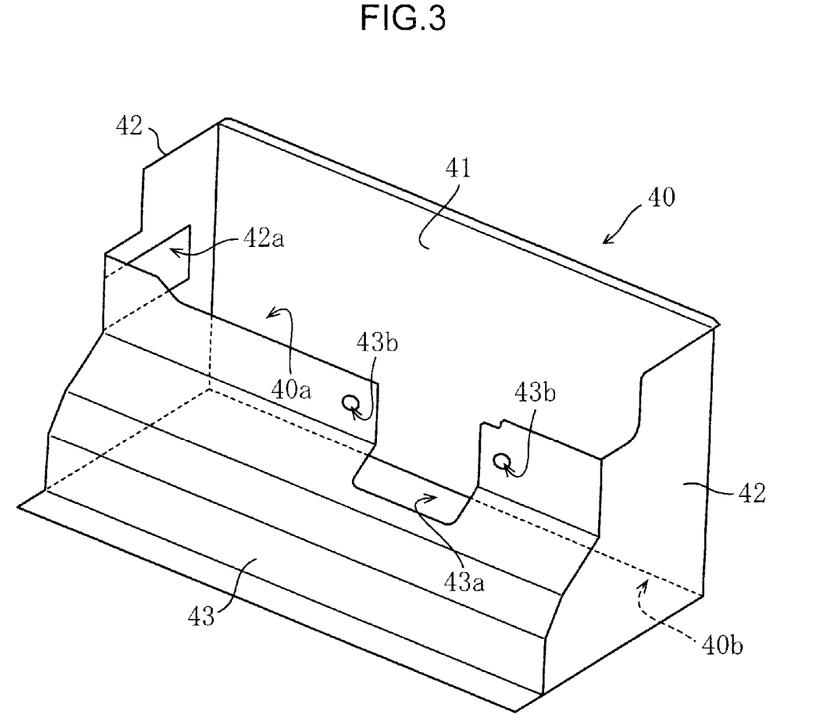
FIG. 3 is a perspective view showing a configuration of an exhaust duct of FIG. 2.

As shown in FIG. 3, the exhaust duct 40 includes a front face wall 41, a pair of left and right side face walls 42, and a rear face wall 43.

Figure 5:
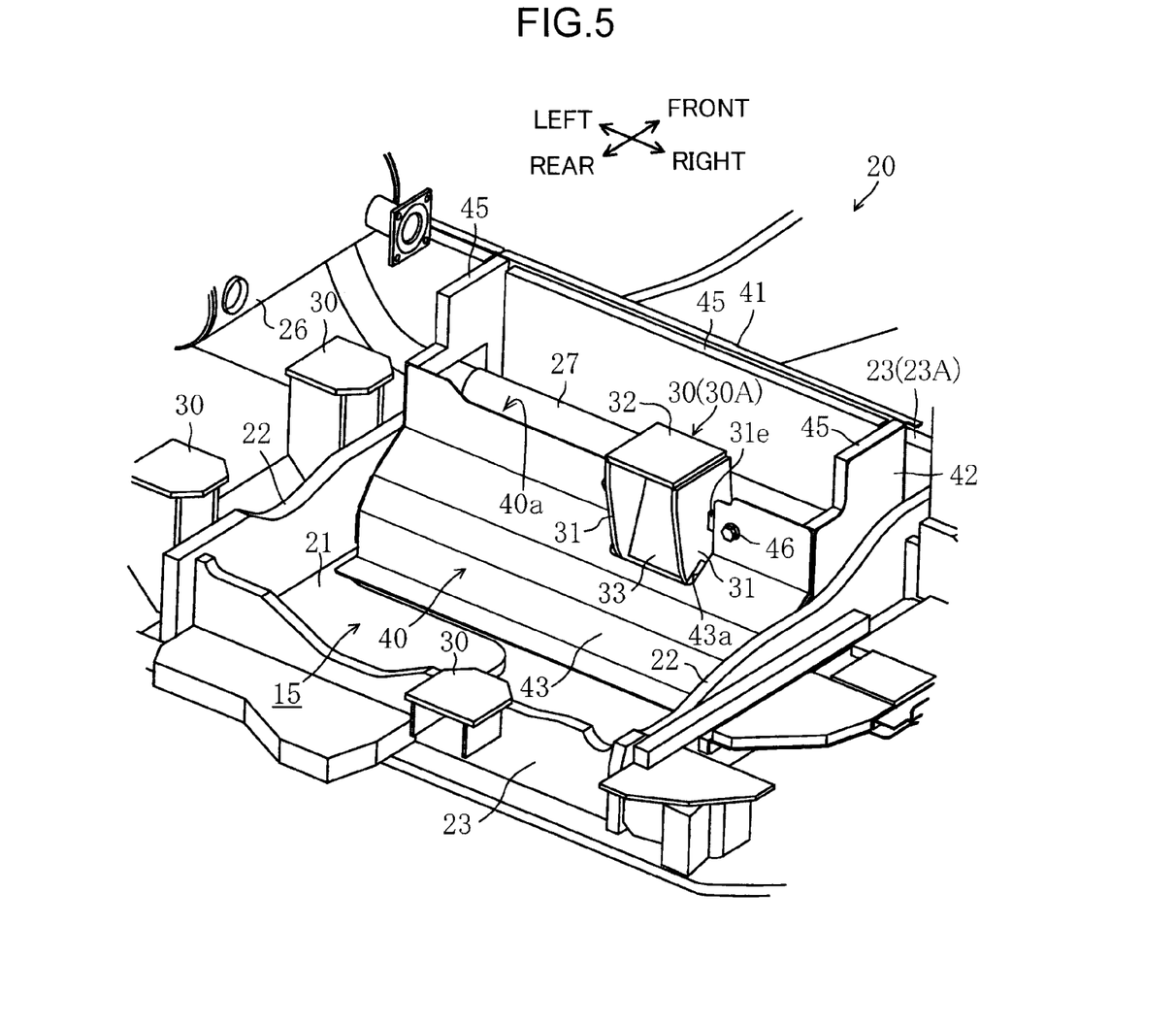
FIG. 5 is a perspective view showing the configuration of the surrounding of the exhaust duct of FIG. 2.

The front face wall 41 is attached to a rear face of the cross beam 23 which is disposed second from a rear side (refer to the cross beam 23A of FIG. 2 and FIG. 5). The left and right side face walls 42 are formed integrally with the front face wall 41 and extend from both left and right end edges of the front face wall 41 to a rear side. The side face wall 42 on a left side is formed with an insertion hole 42a for inserting an exhaust pipe 27 described later.

The rear face wall 43 is formed separately from the front face wall 41 and the side face walls 42. The rear face wall 43 is attached to a duct attaching portion 31e of an engine bracket 30 described later. The rear face wall 43 is formed with a notched portion 43a notched to open in an upper direction. The notched portion 43a is an opening for causing a front end portion of the engine bracket 30A described later to project to the outside of the exhaust duct 40, and is included in the concept of an opening of this invention.

Also, attaching holes 43b are formed on both left and right sides interposing the notched portion 43a. A heat insulation material 45 is attached to inner faces of the front face wall, the left and right side face walls 42, and the rear face wall 43 (refer to FIG. 4).

The front face wall 41, the left and right side face walls 42, and the rear face wall 43 are attached to the upper frame 20 in this manner, whereby the exhaust duct 40 is configured such that an intake port 40a is opened on an upper face side of the exhaust duct 40, and an exhaust port 40b is opened on a lower face side of the exhaust duct 40. Further, the notched portion 43a is formed to communicate with the intake port 40a of the exhaust duct 40. The engine bracket 30A projects to the outside of the exhaust duct 40 so as to be inserted in both the intake port 40a and the notched portion 43a. Thereby, an opening area of the notched portion 43a can be reduced.

Here, a lower portion side of the rear face wall 43 is bulged rearward from an upper portion side of the rear face wall 43, and a lower end portion of the rear face wall 43 overlaps a portion of an opening hole 21a of the bottom plate 21 in a plane view thereof. Thereby, air is taken in from the intake port 40a on an upper face side of the exhaust duct 40 is guided to the opening hole 21a by the exhaust duct 40, and exhausted to outside of the engine room 15 by passing through the opening hole 21a from the exhaust port 40b on a lower face side of the exhaust duct 40.

Figure 4:
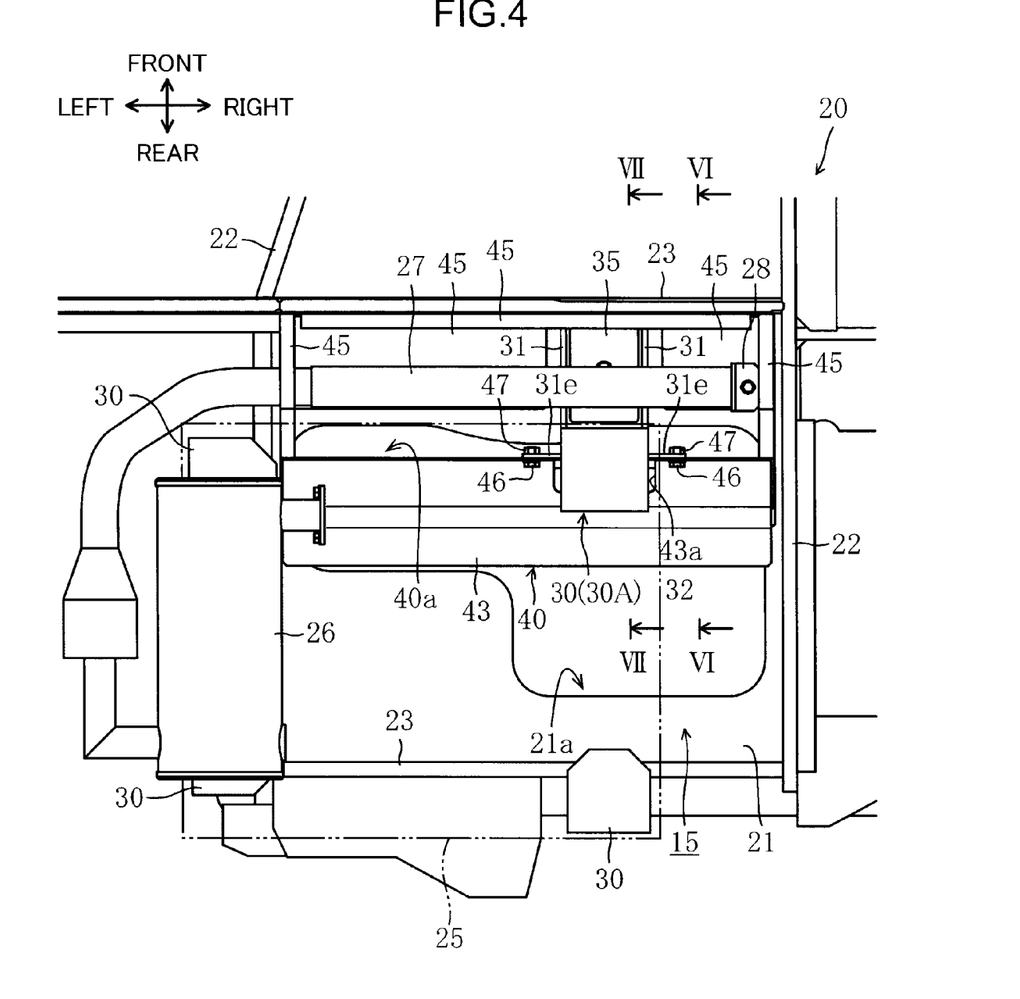
FIG. 4 is plane view showing a configuration of a surrounding of the exhaust duct of FIG. 2.

As shown in FIG. 4, the engine 25 is connected with a muffler 26. An exhaust downstream side of the muffler 26 is connected with the exhaust pipe 27. The exhaust pipe 27 is arranged in the exhaust duct 40, and extends in a vehicle width direction (that is, left and right direction) along the cross beam 23. A front end portion of the exhaust pipe 27 is held by a holding bracket 28 attached to the vertical plate 22 on the right side.

Figure 6:
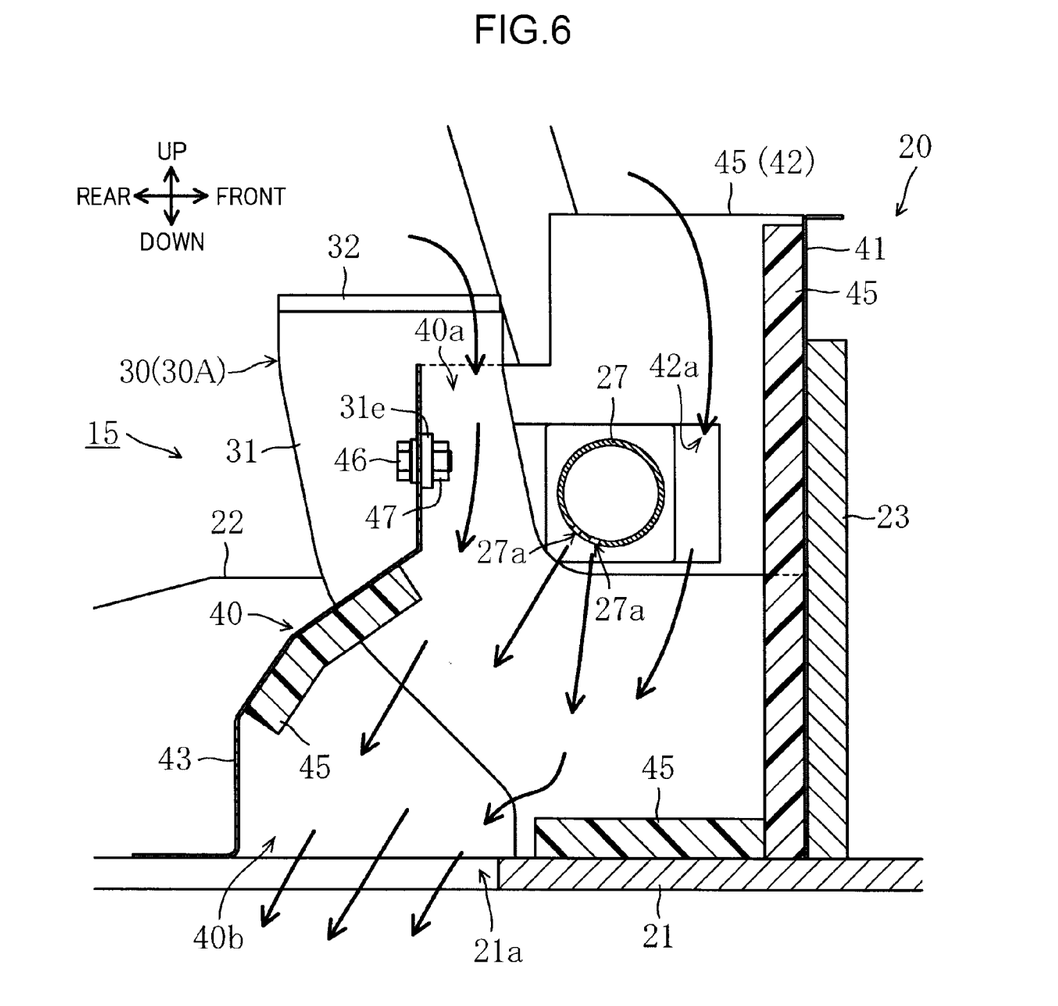
FIG. 6 is a sectional view taken along a line VI-VI of FIG. 4.
Figure 7:
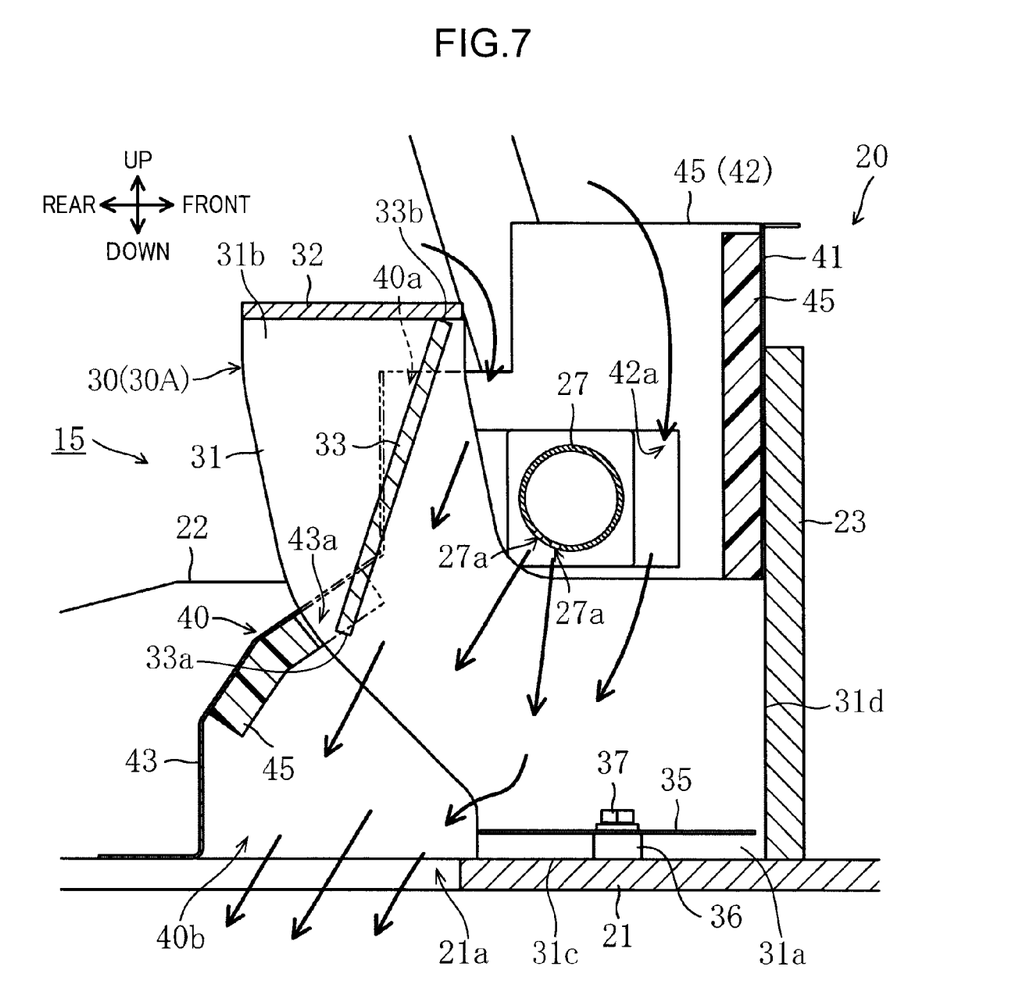
FIG. 7 is a sectional view taken along a line VII-VII of FIG. 4.

An outer peripheral face of the exhaust pipe 27 is formed with a plurality of blow out holes 27a opened in a inclined downward direction toward a vehicle rear side for exhausting exhaust gas to the opening hole 21a of the bottom plate 21 (refer to FIGS. 6 and 7). A large portion of high temperature exhaust gas blown out from the blow out hole 27a of the exhaust pipe 27 is exhausted to a downward side of the bottom plate 21 by passing through the opening hole 21a. That is, air taken in from the engine room 15 to the exhaust duct 40 flows together with the exhaust gas in the exhaust duct 40 and is exhausted in a downward direction along with the exhaust gas.

As shown in FIG. 2, the engine 25 is supported by the engine brackets 30 arranged at four corners of the engine 25. Specifically, the engine brackets 30 at a left front side and at a left rear side are welded to the vertical plate 22 on a left side. The engine bracket 30 on a right rear side is welded to the cross beam 23 which is disposed first from the rear side. The engine bracket 30 on a right front side (refer to engine bracket 30A of FIG. 2) is welded to the cross beam 23 which is disposed second from the rear side (refer to cross beam 23A of FIG. 2). An explanation will be given only of a structure of the engine bracket 30A on the right front side as follows.

As shown in FIG. 4 through FIG. 7, the engine bracket 30A on the right front side is a bracket having a base end portion fixed to the bottom plate 21 of the upper frame 20 inside the exhaust duct 40, and a front end portion projecting to the outside of the exhaust duct 40, and is included in the concept of a projecting bracket of this invention.

The engine bracket 30A includes a pair of engine support legs 31 formed by a pair of plate members stood at an interval therebetween in the vehicle width direction, an engine mount plate 32 mounted with the engine 25 by bridging upper portions of the pair of engine support legs 31, and a reinforcement plate 33 connecting the pair of engine support legs 31.

Each of the pair of the engine support legs 31 includes a base end portion 31a fixed to the upper frame 20 in the exhaust duct 40, and a front end portion 31b projecting to the outside of the exhaust duct 40 by passing through the notched portion 43a.

That is, the base end portion 31a of the engine support leg 31 is welded to the upper frame 20 in the exhaust duct 40. Specifically, a lower edge portion 31c of the engine support leg 31 is welded to an upper face of the bottom plate 21, and a side edge portion 31d on a front side of the engine support leg 31 is welded to a face on a rear side of the cross beam 23 along therewith. The engine support leg 31 is configured such that the front end portion 31b projects to the outside of the exhaust duct 40 by extending from the base end portion 31a to the front end portion 31b by passing through a lower side of the exhaust pipe 27, thereafter, extending upward toward the notched portion 43a formed at the exhaust duct 40.

A side wall face of the engine support leg 31 is installed with a duct attaching portion 31e projecting to an outside in the vehicle width direction. The rear face wall 43 of the exhaust duct 40 is commonly fastened to the duct attaching portion 31e by a fastening bolt 46 and a fastening nut 47 in a state of being brought into contact with a rear face of the duct attaching portion 31e.

The engine mount plate 32 is welded to upper portions of the pair of engine support legs 31 so as to bridge the pair of engine support legs. Thereby, a section of the engine bracket 30 has a shape of closing both left and right faces and an upper face thereof, that is, a gate type shape.

The reinforcement plate 33 is arranged between the pair of engine support legs 31. Specifically, the reinforcement plate 33 is arranged in a state of being inclined in a inclined downward direction toward a vehicle rear side to close the notched portion 43a of the exhaust duct 40. Both end portions of the reinforcement plates 33 are respectively welded to the pair of engine support legs 31. Thereby, the pair of engine support legs 31 is connected to each other via the reinforcement plate 33.

When such a configuration is constructed, the reinforcement plate 33 of the engine bracket 30A can be used not only as a rigid member for ensuring a rigidity but also as a closing member configuring a portion of the exhaust duct 40 by closing the notched portion 43a so as not to leak out air therefrom. Also, the reinforcement plate 33 is arranged not to traverse inside of the exhaust duct 40, and therefore, a flow of air in the exhaust duct 40 is not hampered.

Here, as shown in FIG. 7, a lower end edge 33a of the reinforcement plate 33 is arranged on an inner side of the exhaust duct 40 in a side view thereof. Thereby, air flowing in the exhaust duct 40 is exhausted from the exhaust port 40b while being guided in a inclined downward direction along the reinforcement plate 33. Therefore, air can be prevented from leaking out from a position of a boundary of the lower end edge 33a of the reinforcement plate 33 and the notched portion 43a of the exhaust duct 40.

Further, an upper end edge 33b of the reinforcement plate 33 is arranged outside the exhaust duct 40 in a side view thereof Thereby, the rigidity can be increased by making a total length of the reinforcement plate 33 as long as possible.

A heat shield plate 35 is arranged between the pair of support legs 31. Specifically, as shown in FIG. 7, the heat shield plate 35 is arranged at a position of overlapping an exhaust path of the exhaust gas blown from the exhaust pipe 27.

A spacer member 36 is interposed between the bottom plate 21 and the heat shield plate 35. The spacer member 36 is welded to an upper face of the bottom plate 21. The heat shield plate 35 is fastened to fix to the spacer member 36 by a fastening bolt 37. Thereby, the exhaust gas blown out from the exhaust pipe 27 is prevented from being blown directly to the bottom plate 21.

Also, the heat insulation material 45 is arranged on the upper face of the bottom plate 21 between the vertical plate 22 on the right side and the engine support leg 31 on the right side, and on the upper face of the bottom plate 21 between the vertical plate 22 on the left side and the engine support leg 31 on the left side (refer to FIG. 4 and FIG. 6). Thereby, the exhaust gas is prevented from being directly blown to the bottom plate 21 disposed outside the pair of engine support legs 31.

Incidentally, the specific embodiment described above mainly includes the invention having the following configuration.

A construction machine of the embodiment includes:

a lower traveling body;

an upper turning body which has an engine room and an upper frame including a bottom plate formed with an opening hole communicating with an inside of the engine room, and which is turnably mounted on the lower traveling body;

an engine accommodated in the engine room;

an exhaust duct provided in the engine room, for guiding air having cooled the engine to the opening hole, to exhaust the air to the outside of the engine room; and a projecting bracket which is a bracket for supporting the engine and includes an end portion on one side fixed to the upper frame inside the exhaust duct, and an end portion on the other side projecting to the outside of the exhaust duct, wherein the exhaust duct includes an intake port for taking in the air in the engine room, an exhaust port for exhausting the air taken in from the intake port toward the opening hole, and an opening for causing the end portion on the other side of the projecting bracket to project to the outside of the exhaust duct, and wherein the projecting bracket includes:

a pair of engine support legs formed by a pair of plate members stood at an interval therebetween, each of the engine support legs including a base end portion fixed to the upper frame in the exhaust duct, and a front end portion projecting to the outside of the exhaust duct by passing through the opening;

an engine mount plate which is connected to the respective front end portions of the pair of engine support legs and allows the engine to be mounted on the engine mount plate; and a reinforcement plate arranged between the pair of engine support legs so as to close the opening of the exhaust duct, and connecting the pair of engine support legs to each other.

According to the configuration, the base end portions of the pair of engine support legs are fixed to the upper frame in the exhaust duct. The pair of the engine support legs extends toward the opening of the exhaust duct (according to the embodiment, the notched portion 43a) from the base end portions to the front end portions. Thereby, the front end portions project to the outside of the exhaust duct. The pair of engine support legs is connected by the reinforcement plate arranged to close the opening of the exhaust duct.

By constructing such a configuration, air can smoothly be made to flow in the exhaust duct by preventing the flow of air exhausted from the engine room by passing through the exhaust duct from being hampered by the reinforcement plate.

Specifically, although the base end portion of the projecting bracket (according to the embodiment, the engine bracket 30A) is fixed to the upper frame in the exhaust duct, it is necessary for the front end portion of the projecting bracket to project to the outside of the exhaust duct because the engine is mounted on the front end portion of the projecting bracket via the engine mount. Consequently, the exhaust duct is formed with the opening (that is, the notched portion) for inserting the front end portion of the projecting bracket, and according to the embodiment, the reinforcement plate for ensuring the rigidity of the projecting bracket is arranged to close the opening of the exhaust duct.

Thereby, the reinforcement plate of the projecting bracket can be used not only as the rigid member for ensuring the rigidity but also as the closing member configuring a portion of the exhaust duct by closing the opening so as not to leak out air from the opening. Also, the reinforcement plate is arranged so as not to traverse the exhaust duct, and therefore, the flow of air in the exhaust duct is not hampered.

Further, according to the embodiment, the lower end edge of the reinforcement plate is arranged on the inner side of the exhaust duct in a side view thereof, and therefore, air passing through the exhaust duct can be guided to the exhaust port by preventing air from leaking out from the position of the boundary of the lower end edge of the reinforcement plate and the notched portion of the exhaust duct.

Further, according to the embodiment, the upper end edge of the reinforcement plate is arranged outside the exhaust duct in a side view thereof, and therefore, the rigidity of the projecting bracket can be increased by making the total length of the reinforcement plate as long as possible.

According to the embodiment, the reinforcement plate of the projecting bracket can be used not only as the rigid member for ensuring the rigidity of the projecting bracket but also as the closing member configuring the portion of the exhaust duct by closing the notched portion so as not to leak out air from the notched portion. Also, the reinforcement plate is arranged not to traverse inside of the exhaust duct, and therefore, the flow of air in the exhaust duct is not hampered.

Also, according to the embodiment, the opening communicates with the intake port, and the projecting bracket projects to the outside of the exhaust duct so as to be inserted in both the intake port and the opening. Consequently, the opening area of the opening can be reduced.

As has been explained above, this invention achieves an effect of high serviceability which can prevent the flow of air exhausted by passing through the exhaust duct from the engine room from being hampered by improving the shape of the engine bracket, and therefore, the invention is extremely useful and the industrial applicability of the invention is excellent.

Incidentally, although according to the embodiment, the notched portion is formed as the opening for causing the projecting bracket to project from the inside of the exhaust duct to the outside of the engine bracket, this invention is not limited thereto. As the opening, a closed through hole (that is, the through hole which does not communicate with the intake port 40a) formed at the rear face wall 43 may be formed as the opening.

This application is based on Japanese Patent application No. 2013-088889 filed in Japan Patent Office on Apr. 19, 2013, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A construction machine comprising:

a lower traveling body;

an upper turning body which has an engine room and an upper frame including a bottom plate formed with an opening hole communicating with an inside of the engine room, and which is turnably mounted on the lower traveling body;

an engine accommodated in the engine room;

an exhaust duct provided in the engine room, for guiding air having cooled the engine to the opening hole, to exhaust the air to the outside of the engine room; and a projecting bracket which is a bracket for supporting the engine and includes an end portion on one side fixed to the upper frame inside the exhaust duct, and an end portion on the other side projecting to the outside of the exhaust duct, wherein the exhaust duct includes an intake port for taking in the air in the engine room, an exhaust port for exhausting the air taken in from the intake port toward the opening hole, and an opening for causing the end portion on the other side of the projecting bracket to project to the outside of the exhaust duct, and wherein the projecting bracket includes:

a pair of engine support legs formed by a pair of plate members stood at an interval therebetween, each of the engine support legs including a base end portion fixed to the upper frame in the exhaust duct, and a front end portion projecting to the outside of the exhaust duct by passing through the opening;

an engine mount plate which is connected to the respective front end portions of the pair of engine support legs and allows the engine to be mounted on the engine mount plate; and a reinforcement plate arranged between the pair of engine support legs so as to close the opening of the exhaust duct, and connecting the pair of engine support legs to each other.

2. The construction machine according to claim 1, wherein the reinforcement plate has a lower end edge, which is arranged on an inner side of the exhaust duct in a side view thereof.

3. The construction machine according to claim 1, wherein an upper end edge of the reinforcement plate is arranged outside the exhaust duct in a side view thereof.

4. The construction machine according to claim 1, wherein the opening communicates with the intake port, and
- the projecting bracket projects to the outside of the exhaust duct so as to be inserted in both the intake port and the opening.

* * * * *